United States Patent
Wei et al.

(10) Patent No.: US 12,088,825 B2
(45) Date of Patent: Sep. 10, 2024

(54) DECODING AND ENCODING BASED ON ADAPTIVE INTRA REFRESH MECHANISM

(71) Applicant: HANGZHOU HIKVISION DIGITAL TECHNOLOGY CO., LTD., Hangzhou (CN)

(72) Inventors: Liang Wei, Hangzhou (CN); Fangdong Chen, Hangzhou (CN); Li Wang, Hangzhou (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 18/257,818

(22) PCT Filed: Mar. 10, 2022

(86) PCT No.: PCT/CN2022/080113
§ 371 (c)(1),
(2) Date: Jun. 15, 2023

(87) PCT Pub. No.: WO2022/194017
PCT Pub. Date: Sep. 22, 2022

(65) Prior Publication Data
US 2024/0048726 A1    Feb. 8, 2024

(30) Foreign Application Priority Data
Mar. 19, 2021 (CN) .......... 202110298610.4

(51) Int. Cl.
*H04N 19/159* (2014.01)
*H04N 19/107* (2014.01)
*H04N 19/167* (2014.01)

(52) U.S. Cl.
CPC ........ *H04N 19/159* (2014.11); *H04N 19/107* (2014.11); *H04N 19/167* (2014.11)

(58) Field of Classification Search
CPC ... H04N 19/159; H04N 19/107; H04N 19/167
See application file for complete search history.

(56) References Cited

U.S. PATENT DOCUMENTS

| 2003/0016754 A1 | 1/2003 | Gandhi et al. | |
|---|---|---|---|
| 2005/0123044 A1* | 6/2005 | Katsavounidis | H04N 21/434 348/700 |

(Continued)

FOREIGN PATENT DOCUMENTS

| CN | 101621685 | 6/2011 |
|---|---|---|
| CN | 109348227 | 2/2019 |

(Continued)

OTHER PUBLICATIONS

Chen et al., "AHG8/AHG9: On SPS level virtual boundary" Joint Video Experts Team (JVET) of ITU-T SG 16 WP 3 and ISO/IEC JTC 1/SC 29/WG 11, JVET-Q0417-v2,17th Meeting: Brussels, BE, Jan. 7-17, 2020, 8 pages.

(Continued)

Primary Examiner — Hesham K Abouzahra
(74) Attorney, Agent, or Firm — Fish & Richardson P.C.

(57) ABSTRACT

Decoding methods and encoding methods based on an adaptive intra refresh mechanism and related devices are provided. In one aspect, a decoding method includes: receiving a bit stream of a current frame; and determining whether the current frame supports an adaptive intra refresh technology. The determining comprises one of: if there is extension data in the bit stream of the current frame and the extension data carries an adaptive intra refresh video extension identifier (ID), obtaining virtual boundary position information carried in the extension data, and determining whether the current frame supports an adaptive intra refresh technology based on the virtual boundary position information; or if there is no adaptive intra refresh video extension ID in the extension data in the bit stream of the current (Continued)

frame, determining that the current frame does not support the adaptive intra refresh technology.

16 Claims, 3 Drawing Sheets

(56) References Cited

U.S. PATENT DOCUMENTS

2007/0177678 A1* 8/2007 Subramania ......... H04N 19/137
375/240.27
2021/0014529 A1 1/2021 Coban et al.

FOREIGN PATENT DOCUMENTS

| CN | 111212283 | 5/2020 |
|---|---|---|
| CN | 113873236 | 12/2021 |
| JP | 2009510937 | 3/2009 |
| JP | 2019519964 | 7/2019 |
| RU | 2708360 | 12/2019 |
| WO | WO 2020185962 | 9/2020 |
| WO | WO 2020188149 | 9/2020 |
| WO | WO 2020262504 | 12/2020 |

OTHER PUBLICATIONS

International Written Opinion in International Appln. No. PCT/CN2022/080113, mailed on May 25, 2022, 7 pages (with English translation).

Office Action in Australian Appln. No.2022235806, mailed on Jul. 15, 2023, 4 pages.

Paluri et al.,"[AHG9]: On virtual boundary signalling" Joint Video Experts Team (JVET) of ITU-T SG 16 WP 3 and ISO/IEC JTC 1/SC 29/WG 11, JVET-Q0246-v3,17th Meeting: Brussels, BE, Jan. 7-17, 2020, 4 pages.

International Search Report in International Appln. No. PCT/CN2022/080113, mailed on May 25, 2022, 4 pages (with English translation).

Kazui, "AHG14: Study of methods for progressive intra refresh", Fujitsu Laboratories Ltd., JVET-L0079, Oct. 2018, 9 pages.

Notice of Allowance in Chinese Appln. No. 202110298610.4, dated Mar. 17, 2023, 7 pages (with English translation).

Office Action in Chinese Appln. No. 202110298610.4, dated Jan. 12, 2023, 10 pages (with English translation).

Schreier et al., "Motion adaptive intra refresh for low-delay video coding," 2006 Digest of Technical Papers International Conference on Consumer Electronics, Las Vegas, NV, 2006, 2 pages.

Bross et al., "Versatile Video Coding Editorial Refinements on Draft 10," Joint Video Experts Team (JVET) of ITU-T SG 16 WP 3 and ISO/IEC JTC 1/SC 29, JVET-T2001-v2, 20th Meeting, by teleconference, Oct. 7-16, 2020, 514 pages.

Chen et al., "Algorithm description for Versatile Video Coding and Test Model 11 (VTM 11)," Joint Video Experts Team (JVET) of ITU-T SG 16 WP 3 and ISO/IEC JTC 1/SC 29, JVET-T2002-v2, 20th Meeting, by teleconference, Oct. 7-16, 2020, 101 pages.

Extended European Search Report in European Appln No. 22770372.5, dated Feb. 20, 2024, 15 pages.

Hong et al., "GDR Software," Joint Video Experts Team (JVET) of ITU-T SG 16 WP 3 and ISO/IEC JTC 1/SC 29, JVET-U0097-r1, 21st Meeting, by teleconference, Jan. 6-15, 2021, 3 pages.

Hong et al., "GDR Software," Joint Video Experts Team (JVET) of ITU-T SG 16 WP 3 and ISO/IEC JTC 1/SC 29, JVET-T0078, 20th Meeting, by Teleconference, Oct. 7-16, 2020, 2 pages.

Office Action in Japanese Appln. No. 2023-539363, mailed on Jan. 29, 2024, 6 pages (with English translation).

* cited by examiner

DECODING AND ENCODING BASED ON ADAPTIVE INTRA REFRESH MECHANISM

CROSS-REFERENCE TO RELATED APPLICATIONS

This application is the national phase of International Application No. PCT/CN2022/080113 filed on Mar. 10, 2022, which claims priority to a Chinese Patent Application No. 202110298610.4 filed on Mar. 19, 2021, the entire contents of which are incorporated herein by reference.

TECHNICAL FIELD

Embodiments of the present disclosure relate to the field of video encoding and decoding, and in particular to methods for decoding and encoding based on an adaptive intra refresh mechanism and related devices.

BACKGROUND

In order to solve the problem that decoding an I picture takes a long time due to an excessive bit rate of the I picture, an intra refresh mechanism emerges. The basic principle of the intra refresh mechanism is to spread a bit rate of an I picture to several P pictures. In the process of encoding, a complete picture (frame) is divided into N forced intra areas based on a refresh period, and N intra refresh frames for the picture are sequentially encoded. Each of the N intra refresh frames includes one of the N forced intra areas. The encoding mode of the N forced intra areas is a forced intra mode, and other areas in each intra refresh frame are allowed to adopt an inter mode, so that the bit rate of each intra refresh frame is not only reduced relative to that of the I picture, but also relatively stable. However, the process of starting the intra refresh mechanism based on the current syntax is somewhat redundant.

SUMMARY

The embodiments of the present disclosure provide decoding and encoding methods based on an adaptive intra refresh mechanism and related devices, which can improve the application flexibility of the intra refresh mechanism. The technical solution is as follows.

In an aspect, there is provided a decoding method based on an adaptive intra refresh mechanism, the method includes: receiving a bit stream of a current frame; if there is extension data in the bit stream of the current frame and the extension data carries an adaptive intra refresh video extension identifier (ID), obtaining virtual boundary position information carried in the extension data, where the virtual boundary position information is for indicating a position of a virtual boundary, and the virtual boundary is at least for distinguishing a refreshed area from an unrefreshed area in the current frame; and determining whether the current frame supports an adaptive intra refresh technology based on the virtual boundary position information.

Based on the above method, in an implementation, the method further includes: if there is no adaptive intra refresh video extension ID in the extension data in the bit stream of the current frame, determining that the current frame does not support the adaptive intra refresh technology.

Based on the above method, in an implementation, the virtual boundary position information includes first virtual boundary position information and second virtual boundary position information; where the first virtual boundary position information is for indicating a pixel position of the virtual boundary in a horizontal direction of the current frame, and the second virtual boundary position information is for indicating a pixel position of the virtual boundary in a vertical direction of the current frame.

Based on the above method, in an implementation, the first virtual boundary position information is an x-coordinate of the virtual boundary in the horizontal direction of the current frame, and the second virtual boundary position information is a y-coordinate of the virtual boundary in the vertical direction of the current frame; the refreshed area refers to a rectangular area with coordinates (0, 0) of an upper left corner of a picture as an origin, a width being the x-coordinate, and a height being the y-coordinate, and the unrefreshed area refers to other areas in the current frame except the refreshed area.

Based on the above method, in an implementation, determining whether the current frame supports the adaptive intra refresh technology based on the virtual boundary position information includes: if a value of the first virtual boundary position information and a value of the second virtual boundary position information are both greater than 0, determining that the current frame supports the adaptive intra refresh technology; if the value of the first virtual boundary position information is equal to 0 and/or the value of the second virtual boundary position information is equal to 0, determining that the current frame does not support the adaptive intra refresh technology.

Based on the above method, in an implementation the method further includes: if the current frame supports the adaptive intra refresh technology, and a previous frame of the current frame in a decoding order does not support the adaptive intra refresh technology, determining that the current frame is a random access point. The previous frame does not support the adaptive intra refresh technology, includes: there is no adaptive intra refresh video extension ID in extension data of the previous frame; or there is the adaptive intra refresh video extension ID in the extension data of the previous frame, and a value of first virtual boundary position information of the previous frame is equal to 0 and/or a value of second virtual boundary position information of the previous frame is equal to 0.

Based on the above method, in an implementation, the method further includes: if it is determined that the current frame supports the adaptive intra refresh technology, and it is determined that the pixel position of the virtual boundary is equal to or exceeds a right boundary of the current frame based on the first virtual boundary position information of the current frame, and that the pixel position of the virtual boundary is equal to or exceeds a lower boundary of the current frame based on the second virtual boundary position information of the current frame, determining that the current frame is a recovery point of random access.

Based on the above method, in an implementation, an accuracy of the first virtual boundary position information is a width of a Largest Coding Unit (LCU), and an accuracy of the second virtual boundary position information is a height of the LCU.

Based on the above method, in an implementation, when the current frame is used for random access, before decoding the current frame, the method further includes: obtaining a valid sequence header: and decoding the current frame based on information carried by the sequence header.

In another aspect, there is provided an encoding method based on an adaptive intra refresh mechanism, the method includes: determining whether a current frame supports an adaptive intra refresh technology; if the current frame supports the adaptive intra refresh technology, carrying an adaptive intra refresh video extension identifier (ID) and virtual boundary position information of the current frame in extension data of the current frame, where the virtual boundary position information is for indicating a position of a virtual boundary, and the virtual boundary is at least for distinguishing a refreshed area from an unrefreshed area in the current frame.

Based on the above method, in an implementation, the virtual boundary position information includes first virtual boundary position information and second virtual boundary position information; the first virtual boundary position information is for indicating a pixel position of the virtual boundary in a horizontal direction of the current frame, and the second virtual boundary position information is for indicating a pixel position of the virtual boundary in a vertical direction of the current frame.

Based on the above method, in an implementation, the first virtual boundary position information is an x-coordinate of the virtual boundary in the horizontal direction of the current frame, and the second virtual boundary position information is a y-coordinate of the virtual boundary in the vertical direction of the current frame; the refreshed area refers to a rectangular area with coordinates (0, 0) of an upper left corner of a picture as an origin, a width being the x-coordinate, and a height being the v-coordinate, and the unrefreshed area refers to other areas in the current frame except the refreshed area.

Based on the above method, in an implementation, if the current frame does not support the adaptive intra refresh technology, the adaptive intra refresh video extension ID is not carried in the extension data of the current frame: or the adaptive intra refresh video extension ID is carried in the extension data of the current frame, and a value of the first virtual boundary position information carried in the extension data of the current frame is equal to 0 and/or a value of the second virtual boundary position information carried in the extension data of the current frame is equal to 0.

Based on the above method, in an implementation, if the current frame supports the adaptive intra refresh technology, the value of the first virtual boundary position information and the value of the second virtual boundary position information carried in the extension data of the current frame are both greater than 0.

Based on the above method, in an implementation, the method further includes: if the current frame is a random access point, determining that the current frame supports the adaptive intra refresh technology, and that a previous frame of the current frame in an encoding order does not support the adaptive intra refresh technology.

Based on the above method, in an implementation, the method further includes: if the current frame is a recovery point of random access, determining that the current frame supports the adaptive intra refresh technology, and that the pixel position of the virtual boundary indicated by the first virtual boundary position information is equal to or exceeds a right boundary of the current frame, and the pixel position of the virtual boundary indicated by the second virtual boundary position information is equal to or exceeds a lower boundary of the current frame.

Based on the above method, in an implementation, an accuracy of the first virtual boundary position information is a width of a. Largest Coding Unit (LCU), and an accuracy of the second virtual boundary position information is a height of the LCU.

In yet another aspect, there is provided a decoding apparatus, including: a receiving module, configured to receive a bit stream of a current frame, and a processing module, configured to, if there is extension data in the bit stream of the current frame and the extension data carries an adaptive intra refresh video extension identifier (ID), obtain virtual boundary position information carried in the extension data, where the virtual boundary position information is for indicating a position of a virtual boundary, and the virtual boundary is at least for distinguishing a refreshed area from an unrefreshed area in the current frame; the processing module is further configured to determine whether the current frame supports an adaptive intra refresh technology based on the virtual boundary position information.

Based on the above apparatus, in an implementation, the processing module is further configured to, if there is no adaptive intra refresh video extension ID in the extension data in the bit stream of the current frame, determine that the current frame does not support the adaptive intra refresh technology.

Based on the above apparatus, in an implementation, the virtual boundary position information includes first virtual boundary position information and second virtual boundary position information. The first virtual boundary position information is for indicating a pixel position of the virtual boundary in a horizontal direction of the current frame, and the second virtual boundary position information is for indicating a pixel position of the virtual boundary in a vertical direction of the current frame.

Based on the above apparatus, in an implementation, the first virtual boundary position information is an x-coordinate of the virtual boundary in the horizontal direction of the current frame, and the second virtual boundary position information is a y-coordinate of the virtual boundary in the vertical direction of the current frame. The refreshed area refers to a rectangular area with coordinates (0, 0) of an upper left corner of a picture as an origin, a width being the x-coordinate, and a height being the y-coordinate. The unrefreshed area refers to other areas in the current frame except the refreshed area.

Based on the above apparatus, in an implementation, the processing module is configured to, if a value of the first virtual boundary position information and a value of the second virtual boundary position information are both greater than 0, determine that the current frame supports the adaptive intra refresh technology; if the value of the first virtual boundary position information is equal to 0 and/or the value of the second virtual boundary position information is equal to 0, determine that the current frame does not support the adaptive intra refresh technology.

Based on the above apparatus, in an implementation, the processing module is further configured to, if the current frame supports the adaptive intra refresh technology, and a previous frame of the current frame in a decoding order does not support the adaptive intra refresh technology, determine that the current frame is a random access point. The previous frame does not support the adaptive intra refresh technology, includes: there is no adaptive intra refresh video extension ID in extension data of the previous frame; or there is the adaptive intra refresh video extension ID in the extension data of the previous frame, and a value of first virtual boundary position information of the previous frame is equal to 0 and/or a value of second virtual boundary position information of the previous frame is equal to 0.

Based on the above apparatus, in an implementation, the processing module is further configured to, if it is determined that the current frame supports the adaptive intra refresh technology, and it is determined that the pixel position of the virtual boundary is equal to or exceeds a right boundary of the current frame based on the first virtual boundary position information of the current frame, and that the pixel position of the virtual boundary is equal to or exceeds a lower boundary of the current frame based on the second virtual boundary position information of the current frame, determine that the current frame is a recovery point of random access.

Based on the above apparatus, in an implementation, an accuracy of the first virtual boundary position information is a width of a. Largest Coding Unit (LCU), and an accuracy of the second virtual boundary position information is a height of the LCU.

Based on the above apparatus, in an implementation, the processing module is further configured to, when the current frame is used for random access, obtain a valid sequence header before decoding the current frame; and decode the current frame based on information carried by the sequence header.

On yet another aspect, there is provided an encoding apparatus, including: an encoding module configured to determine whether a current frame supports an adaptive intra refresh technology. The encoding module is further configured to, if the current frame supports the adaptive intra refresh technology, carry an adaptive intra refresh video extension identifier (ID) and virtual boundary position information of the current frame in extension data of the current frame, where the virtual boundary position information is for indicating a position of a virtual boundary, and the virtual boundary is at least for distinguishing a refreshed area from an unrefreshed area in the current frame.

Based on the above apparatus, in an implementation, the virtual boundary position information includes first virtual boundary position information and second virtual boundary position information. The first virtual boundary position information is for indicating a pixel position of the virtual boundary in a horizontal direction of the current frame, and the second virtual boundary position information is for indicating a pixel position of the virtual boundary in a vertical direction of the current frame.

Based on the above apparatus, in an implementation, the first virtual boundary position information is an x-coordinate of the virtual boundary in the horizontal direction of the current frame, and the second virtual boundary position information is a v-coordinate of the virtual boundary in the vertical direction of the current frame. The refreshed area refers to a rectangular area with coordinates (0, 0) of an upper left corner of a picture as an origin, a width being the x-coordinate, and a height being the y-coordinate. The unrefreshed area refers to other areas in the current frame except the refreshed area.

Based on the above apparatus, in an implementation, the encoding module is further configured to, if the current frame does not support the adaptive intra refresh technology, carry no the adaptive intra refresh video extension ID in the extension data of the current frame; or carry the adaptive intra refresh video extension ID in the extension data of the current frame, and a value of the first virtual boundary position information carried in the extension data of the current frame is equal to 0 and/or a value of the second virtual boundary position information carried in the extension data of the current frame is equal to 0.

Based on the above apparatus, in an implementation, if the current frame supports the adaptive intra refresh technology, the value of the first virtual boundary position information and the value of the second virtual boundary position information carried in the extension data of the current frame are both greater than 0.

Based on the above apparatus, in an implementation, the encoding module is further configured to, if the current frame is a random access point, determine that the current frame supports the adaptive intra refresh technology, and that a previous frame of the current frame in an encoding order does not support the adaptive intra refresh technology.

Based on the above apparatus, in an implementation, the encoding module is further configured to, if the current frame is a recovery point of random access, determine that the current frame supports the adaptive intra refresh technology, and that the pixel position of the virtual boundary indicated by the first virtual boundary position information is equal to or exceeds a night boundary of the current frame, and the pixel position of the virtual boundary indicated by the second virtual boundary position information is equal to or exceeds a lower boundary of the current frame.

Based on the above apparatus, in an implementation, an accuracy of the first virtual boundary position information is a width of a Largest Coding Unit (LCU), and an accuracy of the second virtual boundary position information is a height of the LCU.

In yet another aspect, there is provided a decoding device that includes a processor and a memory configured to store instructions executable by the processor; where the processor is configured to perform any of the steps of the decoding method based on the adaptive intra refresh mechanism described above.

In yet another aspect, there is provided a encoding device that includes a processor and a memory configured to store instructions executable by the processor; where the processor is configured to perform any of the steps of the encoding method based on the adaptive intra refresh mechanism described above.

In yet another aspect, there is provided a computer-readable storage medium storing instructions that, when executed by a processor, implement any of the steps of the decoding method based on the adaptive intra refresh mechanism or the encoding method based on the adaptive intra refresh mechanism described above.

In yet another aspect, there is provided a computer program product containing instructions that, when run on a computer, causes the computer to perform any of the steps of the decoding method based on the adaptive intra refresh mechanism or the encoding method based on the adaptive intra refresh mechanism described above.

The beneficial effects brought by the technical solution provided in the embodiments of the present disclosure at least include: an adaptive intra refresh video extension ID and virtual boundary position information are added in the extension data in bit stream of the current frame. Since the virtual boundary position information can indicate the position of the virtual boundary, and the virtual boundary is at least used for distinguishing the refreshed area from the unrefreshed area in the current frame, the encoding side can arbitrarily set the virtual boundary based on the actual requirements when dividing the refresh area of the current frame. The position of the virtual boundary can be indicated through the virtual boundary position information, thereby improving the flexibility of dividing the refresh area. That is, the embodiment of the present disclosure provides an adaptive intra refresh mechanism that adaptively divides the refresh area through extension data.

BRIEF DESCRIPTION OF THE DRAWINGS

In order to more clearly explain the technical solution in the embodiments of the present disclosure, accompanying drawings in the description of the embodiments will be briefly introduced below. Obviously, the drawings in the following description are only some examples of the present disclosure. For those skilled in the art, other drawings can be obtained based on these drawings without any creative labor.

DETAILED DESCRIPTION OF THE EMBODIMENTS

In order to make the purpose, technical solution, and advantages of the embodiments of the present disclosure more clear, the embodiments of the present disclosure will be further described in detail with reference to the accompanying drawings.

Before explaining methods provided by the embodiments of the present disclosure, application scenarios involved in the embodiments of the present disclosure will be first described.

In video encoding and decoding, a picture (frame) used as a base reference is referred to as an I picture, which is also referred to as a key frame. When the I picture is encoded, the compression rate is very low, so that the I picture can be directly decoded based on a bit stream of the I picture during subsequent decoding, thereby eliminating the need to refer to other pictures, During encoding, a picture that is encoded based on a difference between a previous picture and a current picture is referred to as a P picture. A bit stream of the encoded P picture carries the difference between the previous picture and the current picture, so that the current picture can be decoded based on the I picture, the decoded previous picture and the difference in the bit stream during subsequent decoding. In addition, during encoding, a picture that is encoded based on a difference between a previous picture and a current picture, and a difference between the current picture and a next picture is referred to as a B picture. A bit stream of the encoded B picture carries the difference between the previous picture and the current picture, and the difference between the current picture and the next picture, so that the current picture can be decoded based on the I picture, the decoded previous picture and next picture, and the difference in the bit stream during subsequent decoding. A sequence composed of one I picture and several B pictures or several P pictures after encoding is referred to as a picture sequence (sequence). This sequence is also referred to as an IPPP or IBBB sequence.

When a decoding side accesses the IPPP or IBBB sequence through random access, the bit rate of the I picture is generally much greater than that of the P picture or the B picture, which makes the decoding time of the I picture longer than that of the P picture or the B picture. Especially in weak network environments, it will take a longer time to decode the I picture, which may lead to video freezing.

In order to avoid video freezing caused by the long time required to decode an I picture, an intra refresh mechanism is provided in the industry at present. The core idea of the intra refresh mechanism is to spread the bit rate of an I picture to several P pictures, the encoding mode of a small area of each P picture is a forced intra mode and other areas are allowed to adopt an inter mode, and finally the bit rate of each P picture is much smaller than the original I picture. At the same time, forced intra areas of different P pictures are required to not intersect each other in the intra refresh mechanism, so that after several P pictures, the whole image area can be refreshed based on the forced intra mode.

In order to facilitate subsequent explanation, the principle of the intra refresh mechanism will be described in detail below.

Figure 1:
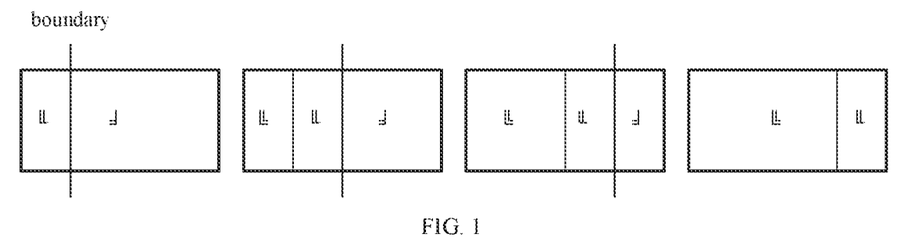
FIG. 1 is a schematic diagram illustrating an intra refresh mechanism according to an embodiment of the present disclosure.

FIG. 1 is a schematic diagram of an intra refresh mechanism according to an embodiment of the present disclosure. The intra refresh mechanism in FIG. 1 is to spread the bit rate of an I picture to four P pictures, each of which has a forced intra area. An area marked ① is a forced intra area. An area marked ② is a refreshed area of a previous frame in an encoding order and is allowed to adopt an inter mode, so this area is also referred to as an inter area of the current frame. An area marked ③ is an unrefreshed area, and this area is allowed to adopt the inter mode.

As shown in FIG. 1, a complete picture is divided into four forced intra areas, and a refresh period includes four intra refresh frames, which are respectively four pictures from left to right in FIG. 1. For a first picture in the refresh period, the picture includes an intra refresh area and an unrefreshed area. Since the first picture is the first picture in the refresh period, a refreshed area in the first picture only includes the forced intra area in the current picture. For a second picture in the refresh period, the picture includes a refreshed area in the first picture, an intra refresh area, and an unrefreshed area. The refreshed area of the first picture included in the second picture and the intra refresh area included in the current picture are collectively referred to as a refreshed area of the second picture. For a third picture in the refresh period, the picture includes a refreshed area in the second picture, an intra refresh area, and an unrefreshed area. The refreshed area of the second picture included in the third picture and the intra refresh area included in the current picture are collectively referred to as a refreshed area of the third picture. For a fourth picture in the refresh period, the picture includes a refreshed area in the third picture and an intra refresh area. The refreshed area of the third picture included in the fourth picture and the intra refresh area included in the current picture are collectively referred to as a refreshed area of the fourth picture. Due to the previous division of the complete picture into four forced intra areas, there is no unrefreshed area in the fourth picture.

In addition, the unrefreshed area is also referred to as a dirty area. The refreshed area of the previous frame and the forced intra area of the current frame in the encoding order can also be collectively referred to as a clean area of the current frame. A boundary between the dirty area and the clean area can be a boundary in FIG. 1. A virtual boundary involved in the embodiments of the present disclosure is also a boundary used for distinguishing the clean area from the dirty area, but the setting manner of the boundary is more flexible, which can be a broken line, not limited to a vertical boundary. In the embodiments of the present disclosure, for any intra refresh frame, a virtual boundary between the refreshed and unrefreshed areas of the intra refresh frame refers to a boundary between the refreshed area and the unrefreshed area, which is also a boundary between the clean and dirty areas of the intra refresh frame.

Figure 2:
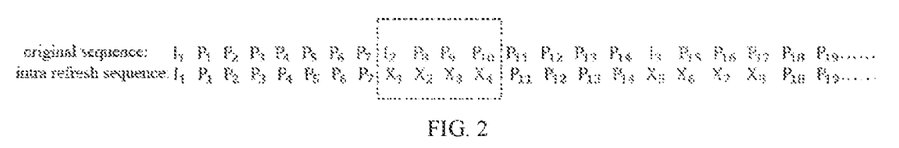
FIG. 2 is a schematic diagram illustrating a sequence after adopting an intra refresh mechanism according to an embodiment of the present disclosure.

FIG. 2 is a schematic diagram illustrating a sequence after adopting an intra refresh mechanism according to an embodiment of the present disclosure. As shown in FIG. 2, four frames I2 (I picture), P8 (P picture), P9 (P picture), and P10 (P picture) in an original picture sequence (referred to as an original sequence in FIG. 2) are replaced with four intra refresh frames, which are marked X1, X2, X3, and X4, and a sequence based on the intra refresh mechanism (referred to as an intra refresh sequence in FIG. 2) is obtained. Each of these four intra refresh frames has a forced intra area, and other areas are allowed to adopt an inter mode. Therefore, these four intra refresh frames can be regarded as four "large P pictures", with a bit rate approximately ¼ of the original I2 frame. In addition, these four intra refresh frames can also be referred to as IR frames for short.

In the sequence shown in FIG. 2, in a random access mode, it is assumed that the I2 frame in the original sequence is a random access point, and frames after the I2 frame can be independently decoded, so the P8 frame can only refer to the I2 frame, but not the P7 frame. However, in the sequence based on the intra refresh mechanism (referred to as the intra refresh sequence in FIG. 2), the X1 frame is a random access point, and an inter area in the unrefreshed area of the X1 frame can refer to the P7 frame, but it may not be decoded correctly (since the P7 frame may not have been obtained at the time of random access). Similarly, unrefreshed areas of the X2 and X3 frames may not be decoded correctly. Until all the frames from X1 to X4 are refreshed, the X4 frame without the unrefreshed area can be completely and correctly decoded. This is because at this time, inter areas in the refreshed area of the X4 frame can be decoded based on the bit stream of forced intra areas of the X1 to X3 frames, and the forced intra area in the refreshed area of the X4 frame can be obtained based on the forced intra decoding mode. Therefore, the X1, X2, X3 and X4 frames in FIG. 2 are a refresh period in which only the last frame can be completely and correctly decoded, so this frame is referred to as a recovery point.

It should be noted that in the case of random access, only the recovery point and its subsequent pictures will be displayed to users. Other pictures in the refresh period to which the random access point belongs will not be displayed since they may not be decoded correctly. In the case of non-random access, all pictures can be completely and correctly decoded, so all pictures will be displayed to users.

In addition, in order to ensure the decoding function of the bit stream encoded based on the intra refresh mechanism, the current intra refresh mechanism restricts the intra mode/inter mode and loop filtering in the decoding mode as follows.

Condition 1: For any intra refresh frame, blocks of the refreshed area of the intra refresh frame can only be decoded by referring to refreshed areas of other intra refresh frames in the same refresh period, and cannot be decoded by referring to unrefreshed areas of other intra refresh frames. In a temporal motion vector prediction (TMVP) mechanism, a co-located block of a current block in a reference frame cannot fall in an unrefreshed area of the reference frame, where the co-located block refers to a picture block in the same position as the current block in the reference frame. That is, an area to which motion vector (MV) information of a picture block of the current picture points cannot fall in the unrefreshed area of the reference frame. It should be noted that in the embodiments of the present disclosure, the current block and the current picture block refer to the same concept. For the convenience of explanation, the current picture block can be simply referred to as the current block.

Condition 2: For any intra refresh frame, there is no reference limit when decoding blocks of the unrefreshed area of the intra refresh frame.

Condition 3: For a picture in a sequence that is not an intra refresh frame, blocks of the picture are allowed to be decoded by referring to refreshed areas of intra refresh frames in a random access period to which the frame belongs, but cannot be decoded by referring to unrefreshed areas of the intra refresh frames in the random access period to which the frame belongs. In the TMVP mechanism, a co-located block of a current block in a reference frame cannot fall in an unrefreshed area of the reference frame.

Condition 4: For any intra refresh frame, loop filtering cannot cross a boundary between the refreshed and unrefreshed areas of the intra refresh frame, which means that loop filtering operations are not performed on a virtual boundary between the refreshed area and the unrefreshed area.

At present, the gradual decoding refresh (GDR) technology in versatile video coding (VVC) standard provides an intra refresh mechanism. The specific content of the intra refresh mechanism is as follows.

Firstly, a refreshed area and an unrefreshed area are divided by vertical division. In the vertical division mode, a virtual boundary between the refreshed area and the unrefreshed area is a dividing line parallel to a Y axis in a picture coordinate system. The dividing boundary is aligned to the width and height of a smallest coding unit (CU, the smallest CU is 8 pixels), that is, the width of the refreshed area is an integer multiple of the width of the smallest CU, and the height of the refreshed area is a picture height of the intra refresh frame.

Figure 3:
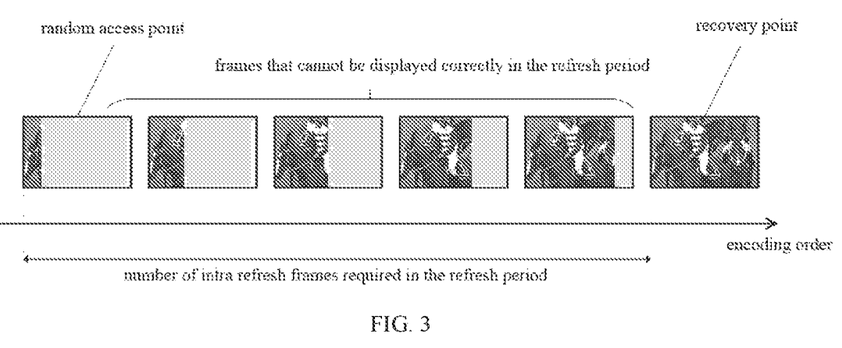
FIG. 3 is a schematic diagram illustrating a sequence after adopting an intra refresh mechanism according to an embodiment of the present disclosure.

Secondly, forced inter areas of different intra refresh frames are equally divided, and a width of the forced inter area=a total width of the picture/refresh period. The refresh period refers to a number of intra refresh frames required for correctly decoding to obtain a complete picture. For example, the refresh period in FIG. 3 is 6. The refresh period can be configured by an encoding side, for example, the encoding side can set the refresh period through a picture header parameter (for example, recovery_poc_cnt) of a bit stream of a intra refresh frame. For the sequence shown in FIG. 3, it can be set that recovery_poc_cnt=6, indicating that the refresh period to which the intra refresh frame belongs is 6. In addition, the refresh order is from left to right by default, which does not need to be explicitly indicated in the bit stream. A decoding side decodes each intra refresh frame in a refresh order from left to right by default.

In addition, for any picture, the encoding side can also identify whether a current picture is an intra refresh frame based on a picture header parameter (for example, gdr_pic_flag) of a bit stream of the picture. For example, when gdr_pic_flag=1 it indicates that the current picture is an intra refresh frame, when gdr_pic_flag=0, it indicates that the current picture is not an intra refresh frame.

In addition, the intra refresh mechanism in the VCC standard also includes the above four restrictions, namely Condition 1 to Condition 4, which will not be described in detail herein.

The division manner of forced intra areas in the intra refresh mechanism in the above VCC standard is not flexible enough, and the forced intra areas can only be equidistant vertical stripe areas, which cannot adaptively divide areas based on picture contents. In addition, since the intra refresh mechanism in the VCC standard does not allow loop filtering across a virtual boundary between a refreshed area and an unrefreshed area, the picture quality on the virtual boundary is poor.

Based on the problems in the intra refresh mechanism in the VCC standard described above, an embodiment of the present disclosure provides an encoding and decoding method based on an adaptive intra refresh mechanism. This method provides a more flexible division manner of forced intra areas, and the division manner is configurable at an encoding side. On the one hand, the method provided in the embodiment of the present disclosure can adaptively divide a refreshed area and an unrefreshed area based on picture contents, thus improving the flexibility of division of forced intra areas. In addition, a virtual boundary between the refreshed area and the unrefreshed area can be made to coincide with an object boundary in the picture as much as possible, thereby avoiding the impact on the decoded picture quality due to the inability to perform loop filtering on the virtual boundary.

Since the method provided in the embodiment of the present disclosure can adaptively divide the refreshed area and the unrefreshed area based on the picture contents, an intra refresh frame involved in the embodiment of the present disclosure can also be referred to as an adaptive intra refresh frame. For convenience of explanation, the adaptive intra refresh frame involved in the embodiment of the present disclosure will be referred to as an intra refresh frame or a refresh frame.

The encoding and decoding method based on the adaptive intra refresh mechanism provided by the embodiment of the present disclosure will be explained in detail below.

Figure 4:
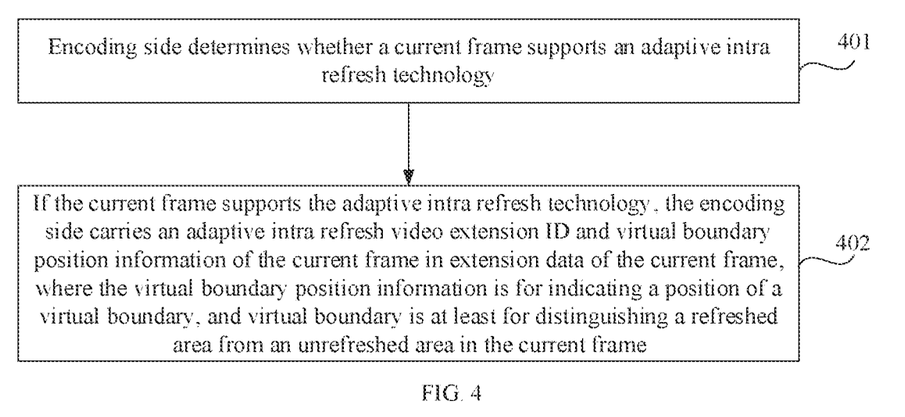
FIG. 4 is a flowchart illustrating an encoding method based on an adaptive intra refresh mechanism according to an embodiment of the present disclosure.

FIG. 4 is a flowchart illustrating an encoding method based on an adaptive intra refresh mechanism according to an embodiment of the present disclosure. As shown in FIG. 4, this method includes the following steps.

Step 401: an encoding side determines whether a current frame (picture) supports an adaptive intra refresh technology.

There is usually a scenario of random access during a user access a video. In the scenario of random access, since a decoding side does not obtain a bit stream before a random access point, the decoding side needs to perform decoding based on a bit stream after the random access point. In this scenario, in order to achieve correct decoding by the decoding side, it is necessary for the bit stream after the random access point to support the adaptive intra refresh technology.

Based on the above scenario, the encoding side can determine whether the current frame supports the adaptive intra refresh technology in following manner. If the current frame is a random access point, it is determined that the current frame supports the adaptive intra refresh technology, but a previous frame in an encoding order does not support the adaptive intra refresh technology. If the current frame is a recovery point of random access, it is determined that the current frame supports the adaptive intra refresh technology. If the current frame is any picture between a random access point and a recovery point of random access, it is determined that the current frame supports the adaptive intra refresh technology.

When the current frame supports the adaptive intra refresh technology, the encoding side needs to determine refreshed and unrefreshed areas in the current frame, so that in the subsequent encoding of bit stream of the current frame, the encoding side can encode virtual boundary position information that indicates a position of a virtual boundary distinguishing the refreshed area from the unrefreshed area in the current frame into the bit stream.

For ease of understanding, the virtual boundary provided in the embodiment of the present disclosure is explained herein.

The virtual boundary can be a boundary line of the refreshed area in the current frame, a boundary line of the unrefreshed area in the current frame, or a dividing line between divided refreshed and unrefreshed areas. The examples of these three virtual boundaries are essentially the same.

The virtual boundary being the dividing line between the divided refreshed and unrefreshed areas as an example is illustrated in subsequent embodiments. That is, the virtual boundary position information can indicate the position of the virtual boundary between the refreshed and unrefreshed areas in the current frame. The position of the virtual boundary can specifically include the position of the virtual boundary in a horizontal direction of the current frame and the position of the virtual boundary in a vertical direction of the current frame.

However, it should be noted that the virtual boundary in the adaptive intra refresh solution provided by the embodiment of the present disclosure is not limited to the above explanation, and the virtual boundary can be any one of the three aforementioned examples of the virtual boundary.

Step 402: if the current frame supports the adaptive intra refresh technology, the encoding side carries an adaptive intra refresh video extension identifier (ID) and virtual boundary position information of the current frame in extension data of the current frame, where the virtual boundary position information is for indicating a position of a virtual boundary, and virtual boundary is at least for distinguishing a refreshed area from an unrefreshed area in the current frame.

It should be noted that the extension data refers to a segment of data between a picture header and picture data in the encoded bit stream of the current frame. In some standards, the extension data is also referred to as supplemental enhancement information (SEI).

At present, a plurality of video extension IDs can be indicated in the extension data, and some decoding parameters can be indicated after each video extension ID. Therefore, in the embodiment of the present disclosure, a new video extension label can be extended in the extension data, and the extended video extension label can be referred to as an adaptive intra refresh video extension ID. The adaptive intra refresh video extension ID is used to notify the decoding side that the extension data further carries parameters related to the position of the virtual boundary (that is, the virtual boundary position information), so that the decoding side can determine whether the current frame supports an adaptive intra refresh mechanism, and then decode the bit stream of the current frame based on the virtual boundary position information.

Table 1 is a schematic table of syntax elements of extension data according to an embodiment of the present disclosure. As shown in Table 1, the extended adaptive intra refresh video extension ID in the embodiment of the present disclosure is "1110". In this scenario, the extension data further includes a field "air_parameters_extension", which is used to indicate the parameters related to the position of the virtual boundary.

TABLE 1

| Definition of extension data | Descriptor |
|---|---|
| extension_data(i) { | |
|   while (next_bits(32) == extension_start_code) { | |
|     extension_start_code | f(32) |
|     if (i == 0) { /* after sequence header */ | |
|       ... ... | |
|     } | |
|   } | |
|   else { /* after picture header */ | |
|     ... ... | |
|     else if (next_bits(4) == '1110') /* parameters extension for adaptive intra refresh */ | |
|       air_parameters_extension( ) | |
|     else { | |
|       while (next_bits(24) != '0000 0000 0000 0000 0000 0001') | |
|         reserved_extension_data_byte | u(8) |
|     } | |
|   } | |
| } | |

It should be noted that the Table 1 is only an example of the syntax elements of the extension data provided by the embodiment of the present disclosure, and the specific representation of these syntax elements is not limited in the embodiment of the present disclosure. In addition, the interpretation of other syntax elements in Table 1 can refer to relevant standards, which are not limited by the embodiment of the present disclosure.

In an implementation, the virtual boundary position information may include first virtual boundary position information and second virtual boundary position information. The first virtual boundary position information is used to indicate a pixel position of the virtual boundary in the horizontal direction of the current frame, and the second virtual boundary position information is used to indicate a pixel position of the virtual boundary in the vertical direction of the current frame.

In this case, as shown in Table 2, the syntax element air_parameters_extension (in Table 1 can include the first virtual boundary position information and the second virtual boundary position information. Table 2 is another schematic table of syntax elements according to an embodiment of the present disclosure. As show % n in Table 2, air_parameters_extension ( ) includes extension_id (used to identify the aforementioned adaptive intra refresh video extension ID), air_bound_x (used to identify the first virtual boundary position information), and air_bound_y (used to identify the second virtual boundary position information).

TABLE 2

| Definition of parameters extension for adaptive intra refresh | Descriptor |
|---|---|
| air_parameters_extension( ) { | |
|   extension_id | f(4) |
|   air_bound_x | ue(v) |
|   air_bound_y | ue(v) |
|   next_start_code( ) | |
| } | |

It should be noted that the above examples of the virtual boundary position information are only for illustrative purposes and does not constitute a limitation on the function of the virtual boundary position information provided by the embodiment of the present disclosure. Any mark information that can indicate the position of the virtual boundary between the refreshed and unrefreshed areas in the current frame in the horizontal direction of the current frame and the position of the virtual boundary in the vertical direction of the current frame is within the scope of the virtual boundary position information provided in the embodiment of the present disclosure.

After determining whether the current frame supports the adaptive intra refresh technology, the bit stream of the current frame can be encoded Specifically, if the current frame does not support adaptive intra refresh technology, the adaptive intra refresh video extension ID is not carried in the extension data of the current frame, or the adaptive intra refresh video extension ID is carried in the extension data of the current frame, but the value of the first virtual boundary position information or the value of the second virtual boundary position information carried in the extension data of the current frame is 0.

Accordingly, if the current frame supports the adaptive intra refresh technology, the adaptive intra refresh video extension ID and virtual boundary position information of the current frame are carried in the extension data of the current frame, and the value of the first virtual boundary position information carried in the extension data of the current frame is greater than 0, and the value of the second virtual boundary position information carried in the extension data of the current frame is also greater than 0.

In an example, the first virtual boundary position information described above is an x-coordinate of the virtual boundary in the horizontal direction of the current frame, and the second virtual boundary position information is a y-coordinate of the virtual boundary in the vertical direction of the current frame. In this scenario, the refreshed area in the current frame refers to a rectangular area with coordinates (0, 0) of an upper left corner of the picture as an origin, a width being the x-coordinate, and a height being the y-coordinate. The unrefreshed area in the current frame refers to other areas in the current frame except the refreshed area.

As another example, the value of the first virtual boundary position information can indicate the width of the virtual boundary in horizontal direction of the current frame is the width of how many Largest Coding Units (LCUs). The value of the second virtual boundary position information can indicate the height of the virtual boundary in the vertical direction of the current frame is the height of how many LCUs.

At this time, air_bound_x in Table 2 indicates the x-coordinate of the virtual boundary between the refreshed area and the unrefreshed area in the picture, and the x-coordinate is in units of the width of the LCU. Air_bound_y in Table 2 indicates the y-coordinate of the virtual boundary between the refreshed area and the unrefreshed area in the picture, and the y-coordinate is in units the height of the LCU.

For example, if the value of the first virtual boundary position information is 2, and the value of the second virtual boundary position information is 3, it indicates that the current refreshed area refers to a rectangular area with the coordinates (0, 0) of the upper left corner of the picture as the origin, with twice the width of the LCU as the x-coordinate, and with three times the height of the LCU as the y-coordinate.

In this scenario, the accuracy of the first virtual boundary position information is the width of one LCU, and the accuracy of the second virtual boundary position information is the height of one LCU.

It should be noted that the above is an example to illustrate the boundary accuracy provided by the embodiment of the present disclosure, and does not constitute a limitation on the scope of boundary accuracy involved in the embodiment of the present disclosure. The boundary accuracy includes width accuracy and height accuracy of the refreshed area. The width accuracy of the refreshed area refers to the minimum width of the refreshed area, and the actual width of the refreshed area is usually configured as an integer multiple of the width accuracy. The height accuracy of the refreshed area refers to the minimum height of the refreshed area, and the actual height of the refreshed area is usually configured as an integer multiple of the height accuracy.

Figure 5:
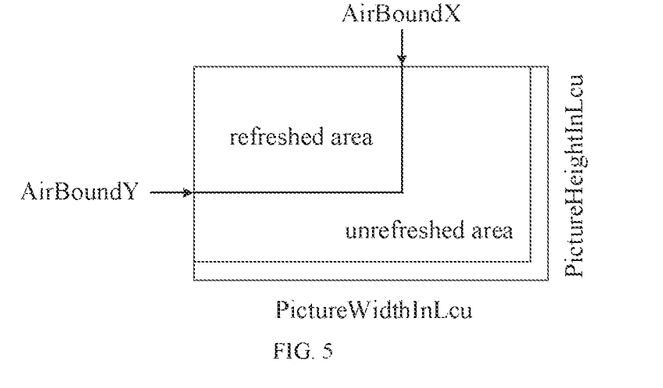
FIG. 5 is a schematic diagram illustrating an area distribution of an intra refresh frame in an adaptive intra refresh mechanism according to an embodiment of the present disclosure.

FIG. 5 is a schematic diagram illustrating an area distribution of an intra refresh frame in an adaptive intra refresh mechanism according to an embodiment of the present disclosure. As shown in FIG. 5, the refreshed area of the intra refresh frame refers to a rectangular area with coordinates (0, 0) as the upper left corner, the width being an x-coordinate AirBoundX, and the height being a y-coordinate AirBoundY. The unrefreshed area of the intra refresh frame refers to other areas in the intra refresh frame except the refreshed area.

That is, the intra refresh frame in FIG. 5 includes the refreshed area and the unrefreshed area. The refreshed area can only be decoded by using the current picture or refreshed areas of other pictures, and the unrefreshed area can be decoded by using the current picture or other pictures.

PictureWidthInLcu in FIG. 5 identifies a value obtained by dividing the width of the picture by the width of the LCU, and PictureHeightInLcu identifies a value obtained by dividing the height of the picture by the height of the LC U. As shown in FIG. 5, the value of AirBoundX should be less than or equal to PictureWidthInLcu, and the value of AirBoundY should be less than or equal to PictureHeightInLcu.

In addition, the AirBoundX and AirBoundY are two variables set for the first virtual boundary position information and the second virtual boundary position information in the syntax during the decoding process. These two variables are still used to indicate the x-coordinate and y-coordinate of the refreshed area in the picture. Specifically, the values of these two variables will be described in detail on the decoding side subsequently, and will not be explained herein.

In addition, if the current frame is a recovery point of random access, the encoding side determines that the current frame supports the adaptive intra refresh technology, and that the pixel position of the virtual boundary indicated by the first virtual boundary position information is equal to or exceeds a right boundary of the current frame, and the pixel position of the virtual boundary indicated by the second virtual boundary position information is equal to or exceeds a lower boundary of the current frame. Therefore, the decoding side can determine whether the current frame is a recovery point of random access based on the first virtual boundary position information and the second virtual boundary position information subsequently.

To sum up, an adaptive intra refresh video extension ID and virtual boundary position information are added in the extension data in bit stream of the current frame. Since the virtual boundary position information can indicate the position of the virtual boundary, and the virtual boundary is at least used for distinguishing the refreshed area from the unrefreshed area in the current frame, the encoding side can arbitrarily set the virtual boundary based on the actual requirements when dividing the refresh area of the current frame. The position of the virtual boundary can be indicated through the virtual boundary position information, thereby improving the flexibility of dividing the refresh area. That is, the embodiment of the present disclosure provides an adaptive intra refresh mechanism that adaptively divides the refresh area through extension data.

Figure 6:
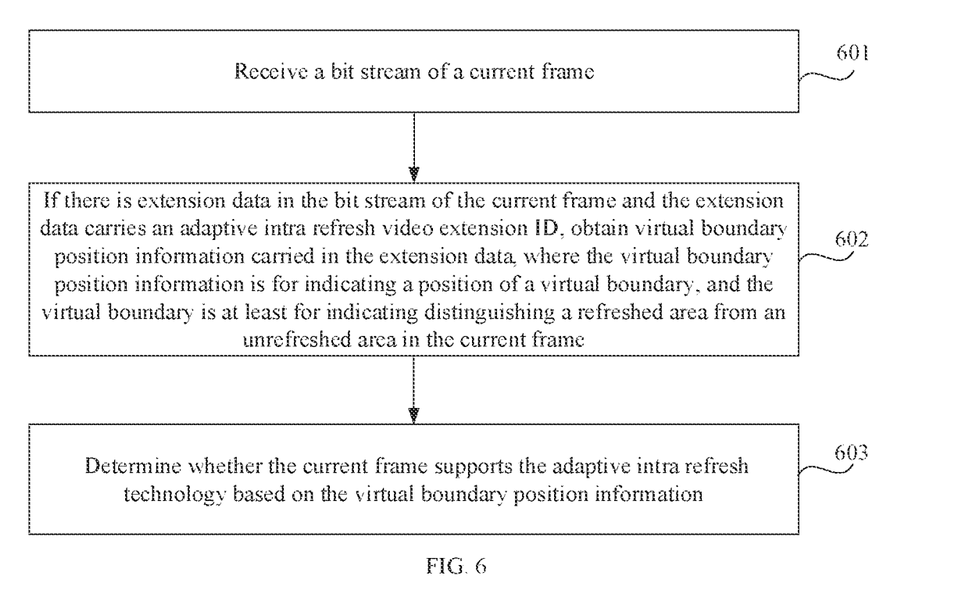
FIG. 6 is a flowchart illustrating a decoding method based on an adaptive intra refresh mechanism according to an embodiment of the present disclosure.

A decoding method based on the intra refresh mechanism provided by an embodiment of the present disclosure will be explained in detail through the embodiment shown in FIG. 6. As shown in FIG. 6, the decoding method includes steps 601 to 603.

Step 601: a bit stream of a current frame is received.

After completing encoding by the method shown in FIG. 4, the encoding side can send the bit stream of each picture to a decoding side, and the decoding side can complete the decoding of the picture based on the embodiment shown in FIG. 6.

Step 602: if there is extension data in the bit stream of the current frame and the extension data carries an adaptive intra refresh video extension identifier (ID), virtual boundary position information carried in the extension data is obtained, where the virtual boundary position information is for indicating a position of a virtual boundary, and the virtual boundary is at least for indicating distinguishing a refreshed area from an unrefreshed area in the current frame.

The related explanation of the adaptive intra refresh video extension ID and the virtual boundary position information can also refer to step 401 in the embodiment of the encoding side, which will not be repeated herein.

In addition, based on the embodiment shown in FIG. 4, it can be seen that, if there is no adaptive intra refresh video extension ID in the extension data in the bit stream of the current frame, it is determined that the current frame does not support the adaptive intra refresh technology.

For example, for syntax elements shown in Table 2, if the video extension ID "1110" is not found in the extension data in the bit stream of the current frame, it is determined that the current frame does not support the adaptive intra refresh technology, and the bit stream of the current frame can be decoded by other decoding methods. The decoding process under the condition that adaptive intra refresh technology is not supported is not limited in the embodiment of the present disclosure.

Step 603: whether the current frame supports the adaptive intra refresh technology is determined based on the virtual boundary position information.

Based on the embodiment shown in FIG. 4, it can be seen that when there is an adaptive intra refresh video extension ID in the extension data, the current frame does not necessarily support the adaptive intra refresh technology. Therefore, after obtaining the virtual boundary position information through step 602, it is necessary to further determine whether the current frame supports the adaptive intra refresh technology based on the virtual boundary position information.

Based on the embodiment shown in FIG. 4, it can be seen that the virtual boundary position information includes the first virtual boundary position information and the second virtual boundary position information. The first virtual boundary position information is for indicating a pixel position of the virtual boundary in a horizontal direction of the current frame, and the second virtual boundary position information is for indicating a pixel position of the virtual boundary in a vertical direction of the current frame.

In this scenario, the implementation process of step 603 is as follows. If the value of the first virtual boundary position information and the value of the second virtual boundary position information are both greater than 0, it is determined that the current frame supports the adaptive intra refresh technology. Accordingly, if the value of the first virtual boundary position information or the value of the second virtual boundary position information is equal to 0, it is determined that the current frame does not support the adaptive intra refresh technology.

For example, for the syntax elements shown in Tables 1 and 2, when decoding extension data, it is determined whether there are adaptive intra refresh parameters air_bound_x and air_bound_y in the bit stream. If there are the two parameters, let the value of AirBoundX of the current frame in FIG. 5 be equal to the value of air_bound_x, and the value of AirBoundY of the current frame be equal to the value of air_bound_y. If there are not the two parameters, let the value of AirBoundX of the current frame be equal to 0, and the value of AirBoundY of the current frame be equal to 0.

The AirBoundX and AirBoundY of the current frame have been explained previously, and will not be repeated herein.

After obtaining AirBoundX and AirBoundY of the current frame, if both AirBoundX and AirBoundY are greater than 0, it is determined that the current frame supports the adaptive intra refresh technology. If AirBoundX and/or AirBoundY are equal to 0, it is determined that the current frame does not support the adaptive intra refresh technology.

In addition, when it is determined that the current frame supports the adaptive intra refresh technology, and a previous frame of the current frame in a decoding order does not support the adaptive intra refresh technology, the decoding side determines that the current frame is a random access point. The previous frame does not support the adaptive intra refresh technology, including the following situations: there is no adaptive intra refresh video extension ID in the extension data of the previous frame, or there is an adaptive intra refresh video extension ID in the extension data of the previous frame, but the value of the first virtual boundary position information of the previous frame is equal to 0 and/or the value of the second virtual boundary position information of the previous frame is equal to 0.

Accordingly, if it is determined that the current frame supports the adaptive intra refresh technology, and it is determined that a pixel position of the virtual boundary is equal to or exceeds a right boundary of the current frame based on the first virtual boundary position information of the current frame, and that the pixel position of the virtual boundary is equal to or exceeds a lower boundary of the current frame based on the second virtual boundary position information of the current frame, the current frame is determined to be a recovery point of random access.

For example, for the syntax elements shown in Tables 1 and 2, if there are parameters air_bound_x and air_bound_y in the extension data of the current frame, and values of the parameters are both greater than 0; at the same time, parameters air_bound_x and air_bound_y of the previous frame of the current frame in the decoding order, do not exist, or exist but at least one is equal to 0, then the current frame is a random access point, and random access is allowed from the current frame.

If there are parameters air_bound_x and air_bound_y in the extension data of the current frame, and the value of air_bound_x is equal to PictureWidthInLcu, and the value of air_bound_y is equal to PictureHeightInLcu, then the current frame is the recovery point, and all pictures (frames) after the current frame can be correctly decoded.

In addition, when the current frame is used for random access, the decoding side also needs to obtain a valid sequence header before decoding the current frame. The current frame is decoded based on information carried by the sequence header.

A valid sequence header can be a sequence header that is located before the bit stream of the current frame and closest to the bit stream of the current frame in bit streams, or can be a sequence header received from a system layer. The information carried in the sequence header includes sequence level information needed in the decoding process, such as the grade and level of the bit stream, enabling switches for various technologies, and the resolution and frame rate of the picture.

It should be noted that in the embodiment of the present disclosure, since the position information of the virtual boundary can be arbitrarily specified, the embodiment of the present disclosure supports horizontal, vertical, and diagonal refreshes, and the refresh direction can be from upper left to lower right, which will not be described in detail herein.

To sum up, an adaptive intra refresh video extension ID and virtual boundary position information are added in the extension data in bit stream of the current frame. Since the virtual boundary position information can indicate the position of the virtual boundary, and the virtual boundary is at least used for distinguishing the refreshed area from the unrefreshed area in the current frame, the encoding side can arbitrarily set the virtual boundary based on the actual requirements when dividing the refresh area of the current frame. The position of the virtual boundary can be indicated through the virtual boundary position information, thereby improving the flexibility of dividing the refresh area. That is, the embodiment of the present disclosure provides an adaptive intra refresh mechanism that adaptively divides the refresh area through extension data.

Figure 7:
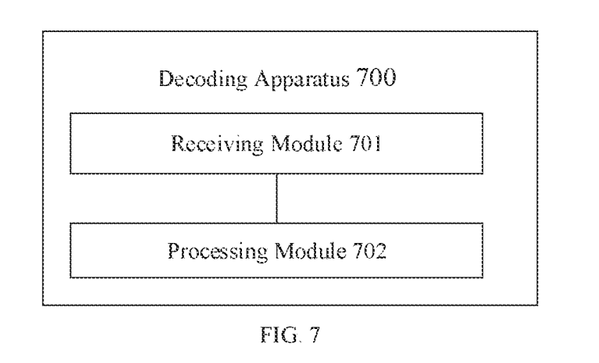
FIG. 7 is a schematic structural diagram illustrating a decoding apparatus according to an embodiment of the present disclosure.

FIG. 7 is a schematic structural diagram illustrating a decoding apparatus according to an embodiment of the present disclosure. As shown in FIG. 7, the decoding apparatus 700 includes the following modules:

a receiving module 701 configured to receive a bit stream of a current frame; and a processing module 702, configured to, if there is extension data in the bit stream of the current frame and the extension data carries an adaptive intra refresh video extension identifier (ID), obtain virtual boundary position information carried in the extension data, where the virtual boundary position information is for indicating a position of a virtual boundary, and the virtual boundary is at least for distinguishing a refreshed area from an unrefreshed area in the current frame.

The processing module 702 is further configured to determine whether the current frame supports an adaptive intra refresh technology based on the virtual boundary position information.

Based on the above apparatus, in an implementation, the processing module is further configured to, if there is no adaptive intra refresh video extension ID in the extension data in the bit stream of the current frame, determine that the current frame does not support the adaptive intra refresh technology.

Based on the above apparatus, in an implementation, the virtual boundary position information includes first virtual boundary position information and second virtual boundary position information. The first virtual boundary position information is for indicating a pixel position of the virtual boundary in a horizontal direction of the current frame, and the second virtual boundary position information is for indicating a pixel position of the virtual boundary in a vertical direction of the current frame.

Based on the above apparatus, in an implementation, the first virtual boundary position information is an x-coordinate of the virtual boundary in the horizontal direction of the current frame, and the second virtual boundary position information is a y-coordinate of the virtual boundary in the vertical direction of the current frame. The refreshed area refers to a rectangular area with coordinates (0, 0) of an upper left corner of a picture as an origin, a width being the x-coordinate, and a height being the v-coordinate. The unrefreshed area refers to other areas in the current frame except the refreshed area.

Based on the above apparatus, in an implementation, the processing module is configured to, if a value of the first virtual boundary position information and a value of the second virtual boundary position information are both greater than 0, determine that the current frame supports the adaptive intra refresh technology; if the value of the first virtual boundary position information is equal to 0 and/or the value of the second virtual boundary position Information is equal to 0, determine that the current frame does not support the adaptive intra refresh technology.

Based on the above apparatus, in an implementation, the processing module is further configured to, if the current frame supports the adaptive intra refresh technology, and a previous frame of the current frame in a decoding order does not support the adaptive intra refresh technology, determine that the current frame is a random access point. The previous frame does not support the adaptive intra refresh technology, includes: there is no adaptive intra refresh video extension ID in extension data of the previous frame; or there is the adaptive intra refresh video extension ID in the extension data of the previous frame, and a value of first virtual boundary position information of the previous frame is equal to 0 and/or a value of second virtual boundary position information of the previous frame is equal to 0.

Based on the above apparatus, in an implementation, the processing module is further configured to, if it is determined that the current frame supports the adaptive intra refresh technology, and it is determined that the pixel position of the virtual boundary is equal to or exceeds a right boundary of the current frame based on the first virtual boundary position information of the current frame, and that the pixel position of the virtual boundary is equal to or exceeds a lower boundary of the current frame based on the second virtual boundary position information of the current frame, determine that the current frame is a recovery point of random access.

Based on the above apparatus, in an implementation, an accuracy of the first virtual boundary position information is a width of a Largest Coding Unit (LCU), and an accuracy of the second virtual boundary position information is a height of the LCU.

Based on the above apparatus, in an implementation, the processing module is further configured to, when the current frame is used for random access, obtain a valid sequence header before decoding the current frame; and decode the current frame based on information carried by the sequence header.

To sum up, an adaptive intra refresh video extension ID and virtual boundary position information are added in the extension data in bit stream of the current frame. Since the virtual boundary position information can indicate the position of the virtual boundary, and the virtual boundary is at least used for distinguishing the refreshed area from the unrefreshed area in the current frame, the encoding side can arbitrarily set the virtual boundary based on the actual requirements when dividing the refresh area of the current frame. The position of the virtual boundary can be indicated through the virtual boundary position information, thereby improving the flexibility of dividing the refresh area. That is, the embodiment of the present disclosure provides an adaptive intra refresh mechanism that adaptively divides the refresh area through extension data.

It should be noted that when the decoding apparatus provided in the above embodiments realizes the decoding method based on the adaptive intra refresh mechanism, the division of the above functional modules is only taken as an example to be illustrated. In practical application, the above functions can be allocated to different functional modules as needed, that is, the internal structure of the device can be divided into different functional modules to complete all or part of the functions described above. In addition, the decoding apparatus provided by the above embodiments belongs to the same concept as the embodiments of the decoding method based on the adaptive intra refresh mechanism. The specific implementation process is detailed in the method embodiments, and will not be repeated herein.

Figure 8:
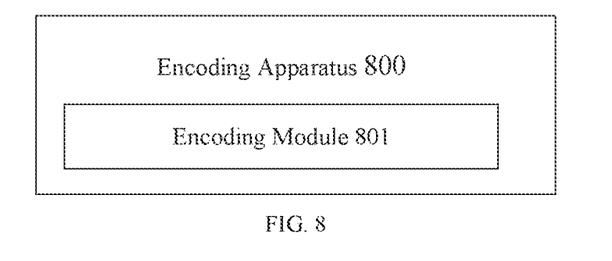
FIG. 8 is a schematic structural diagram illustrating an encoding apparatus according to an embodiment of the present disclosure.

FIG. 8 is a schematic structural diagram illustrating an encoding apparatus according to an embodiment of the present disclosure. As shown in FIG. 8, the encoding apparatus 800 includes an encoding module 801 configured to determine whether a current frame supports an adaptive intra refresh technology. The encoding module is further configured to, if the current frame supports the adaptive intra refresh technology, carry an adaptive intra refresh video extension identifier (ID) and virtual boundary position information of the current frame in extension data of the current frame, where the virtual boundary position information is for indicating a position of a virtual boundary, and the virtual boundary is at least for distinguishing a refreshed area from an unrefreshed area in the current frame.

Based on the above apparatus, in an implementation, the virtual boundary position information includes first virtual boundary position information and second virtual boundary position information. The first virtual boundary position information is for indicating a pixel position of the virtual boundary in a horizontal direction of the current frame, and the second virtual boundary position information is for indicating a pixel position of the virtual boundary in a vertical direction of the current frame.

Based on the above apparatus, in an implementation, the first virtual boundary position information is an x-coordinate of the virtual boundary in the horizontal direction of the current frame, and the second virtual boundary position information is a y-coordinate of the virtual boundary in the vertical direction of the current frame. The refreshed area refers to a rectangular area with coordinates (0, 0) of an upper left corner of a picture as an origin, a width being the x-coordinate, and a height being the y-coordinate. The unrefreshed area refers to other areas in the current frame except the refreshed area.

Based on the above apparatus, in an implementation, the encoding module is further configured to, if the current frame does not support the adaptive intra refresh technology, carry no the adaptive intra refresh video extension ID in the extension data of the current frame; or carry the adaptive intra refresh video extension ID in the extension data of the current frame, and a value of the first virtual boundary position information carried in the extension data of the current frame is equal to 0 and/or a value of the second virtual boundary position information carried in the extension data of the current frame is equal to 0.

Based on the above apparatus, in an implementation, if the current frame supports the adaptive intra refresh technology, the value of the first virtual boundary position information and the value of the second virtual boundary position information carried in the extension data of the current frame are both greater than 0.

Based on the above apparatus, in an implementation, the encoding module is further configured to, if the current frame is a random access point, determine that the current frame supports the adaptive intra refresh technology, and that a previous frame of the current frame in an encoding order does not support the adaptive intra refresh technology.

Based on the above apparatus, in an implementation, the encoding module is further configured to, if the current frame is a recovery point of random access, determine that the current frame supports the adaptive intra refresh technology, and that the pixel position of the virtual boundary indicated by the first virtual boundary position information is equal to or exceeds a right boundary of the current frame, and the pixel position of the virtual boundary indicated by the second virtual boundary position information is equal to or exceeds a lower boundary of the current frame.

Based on the above apparatus, in an implementation, an accuracy of the first virtual boundary position information is a width of a Largest Coding Unit (LCU), and an accuracy of the second virtual boundary position information is a height of the LCU.

To sum up, an adaptive intra refresh video extension ID and virtual boundary position information are added in the extension data in bit stream of the current frame. Since the virtual boundary position information can indicate the position of the virtual boundary, and the virtual boundary is at least used for distinguishing the refreshed area from the unrefreshed area in the current frame, the encoding side can arbitrarily set the virtual boundary based on the actual requirements when dividing the refresh area of the current frame. The position of the virtual boundary can be indicated through the virtual boundary position information, thereby improving the flexibility of dividing the refresh area. That is, the embodiment of the present disclosure provides an adaptive intra refresh mechanism that adaptively divides the refresh area through extension data.

It should be noted that when the encoding apparatus provided in the above embodiments realizes the encoding method based on the adaptive intra refresh mechanism, the division of the above functional modules is only taken as an example to be illustrated. In practical application, the above functions can be allocated to different functional modules as needed, that is, the internal structure of the device can be divided into different functional modules to complete all or part of the functions described above. In addition, the encoding apparatus provided by the above embodiments belongs to the same concept as the embodiments of the encoding method based on the adaptive intra refresh mechanism. The specific implementation process is detailed in the method embodiments, and will not be repeated herein.

Figure 9:
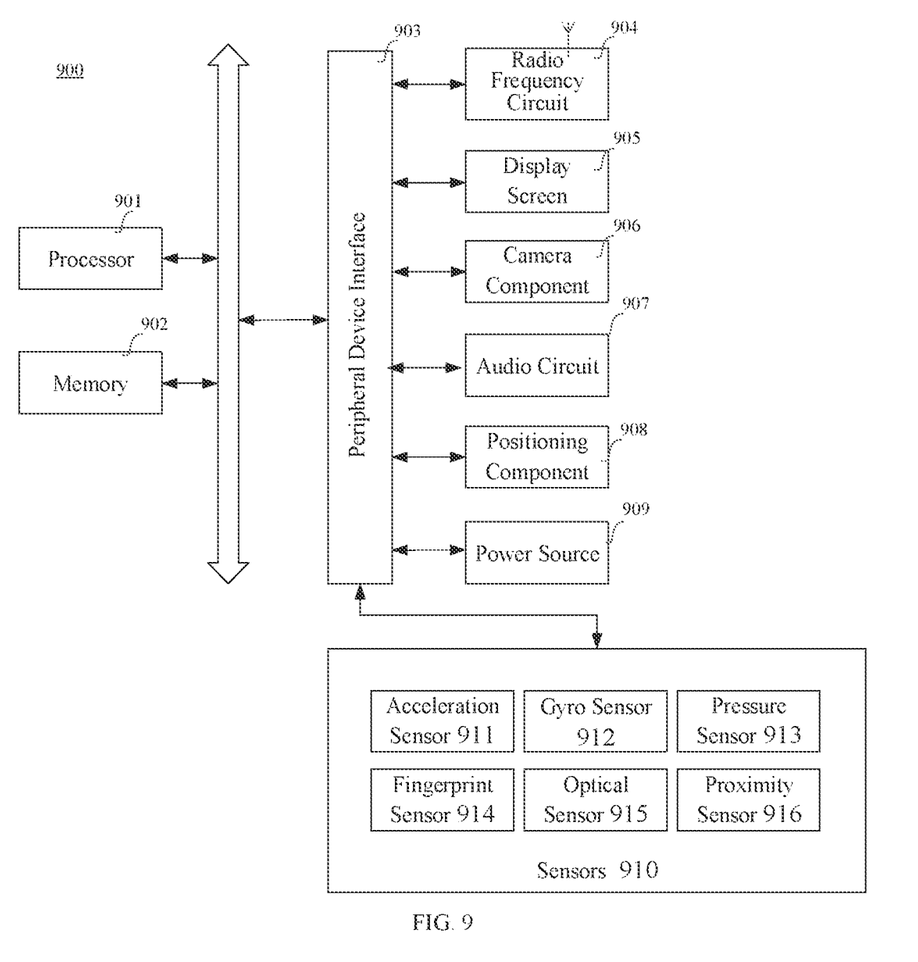
FIG. 9 is a schematic structural diagram illustrating a terminal according to an embodiment of the present disclosure.

FIG. 9 is a structural diagram of a terminal 900 according to an embodiment of the present disclosure. The decoding device, decoding side, decoding apparatus, and encoding device, encoding side, and encoding apparatus involved in the above embodiments can be implemented through this terminal. Specifically, the terminal 900 may be a smart-phone, a tablet computer, a moving picture experts group audio layer III (MP3) player, a moving picture experts group audio layer IV (MP4) player, a laptop computer, or a desktop computer. The terminal 900 may also be called user equipment (UE), a portable terminal, a laptop terminal, a desktop terminal, and the like. Generally, the terminal 900 includes a processor 901 and a memory 902.

The processor 901 may include one or more processing cores, such as a 4-core processor, an 8-core processor or the like. The processor 901 may be implemented by at least one hardware selected from a digital signal processing (DSP), a field-programmable gate array (FPGA), and a programmable logic array (PLA). The processor 901 may also include a host processor and a coprocessor. The host processor is a processor for processing data in an awaken state and is also called a central processing unit (CPU). The coprocessor is a low-power-consumption processor for processing data in a standby state. In some embodiments, the processor 901 may be integrated with a graphics processing unit (GPU), which is configured to render and draw the content that needs to be displayed by a display screen. In some embodiments, the processor 901 may also include an artificial intelligence (AI) processor configured to process computational operations related to machine learning.

The memory 902 may include one or more computer-readable storage mediums, which may be non-transitory. The memory 902 may also include a high-speed random access memory, as well as a non-volatile memory, such as one or more disk storage devices and flash storage devices. In some embodiments, the non-transitory computer-readable storage medium in the memory 902 is configured to store at least one instruction. The at least one instruction is configured to be executed by the processor 901 to perform the decoding methods and encoding methods based on an adaptive intra refresh mechanism provided in the method embodiments of the present disclosure.

In some embodiments, the terminal 900 may optionally include a peripheral device interface 903 and at least one peripheral device. The processor 901, the memory 902, and the peripheral device interface 903 may be connected by a bus or a signal line. Each peripheral device may be connected to the peripheral device interface 903 by a bus, a signal line, or a circuit board. For example, the peripheral device includes at least one radio frequency circuit 904, a display screen 905, a camera component 906, an audio circuit 907, a positioning component 908, and a power source 909.

The peripheral device interface 903 may be configured to connect at least one peripheral device associated with an input/output (I/O) to the processor 901 and the memory 902. In some embodiments, the processor 901, the memory 902, and the peripheral device interface 903 are integrated on the same chip or circuit board. In some other embodiments, any one or two of the processor 901, the memory 902, and the peripheral device interface 903 may be implemented on a separate chip or circuit board, which is not limited in the embodiments of the present disclosure.

The radio frequency circuit 904 is configured to receive and transmit a radio frequency (RE) signal, which is also referred to as an electromagnetic signal. The radio frequency circuit 904 communicates with a communication network and other communication devices via the electromagnetic signal. The radio frequency circuit 904 converts the electrical signal into the electromagnetic signal for transmission, or converts the received electromagnetic signal into the electrical signal. Optionally, the radio frequency circuit 904 includes an antenna system, an RF transceiver, one or more amplifiers, a tuner, an oscillator, a digital signal processor, a codec chipset, a subscriber identity module card, and the like. The radio frequency circuit 904 may communicate with other terminals via at least one wireless communication protocol. The wireless communication protocol includes, but is not limited to, a metropolitan area network, various generations of mobile communication networks (2G, 3G, 4G, and 5G), a wireless local area network, and/or a wireless fidelity (Wi-Fi) network. In some embodiments, the RF circuit 904 may also include near field communication (NFC) related circuits, which is not limited in the present disclosure.

The display screen 905 is configured to display a user interface (UI). The UI may include graphics, text, icons, videos, and any combination thereof. When the display screen 905 is a touch display screen, the display screen 905 also can acquire touch signals on or over the surface of the display screen 905. The touch signal may be input into the processor 901 as a control signal for processing. In this case, the display screen 905 may also be configured to provide virtual buttons and/or virtual keyboards, which are also referred to as soft buttons and/or soft keyboards. In some embodiments, one display screen 905 may be disposed on the front panel of the terminal 900. In some other embodiments, at least two display screens 905 may be respectively disposed on different surfaces of the terminal 900 or in a folded design. In further embodiments, the display screen 905 may be a flexible display screen disposed on the curved or folded surface of the terminal 900. In some cases, the display screen 905 may even have an irregular shape, rather than a rectangle shape, that is, the display screen 905 may be irregular-shaped. The display screen 905 may be prepared with a liquid crystal display (LCD), an organic light-emitting diode (OLED), or other materials.

The camera component 906 is configured to capture images or videos. Optionally, the camera component 906 includes a front camera and a rear camera. Usually, the front camera is arranged on the front panel of the terminal, and the rear camera is arranged on the back surface of the terminal. In some embodiments, at least two rear cameras are disposed, and each of the at least two rear cameras is one camera selected from a main camera, a depth-of-field camera, a wide-angle camera, and a telephoto camera, so as to realize a background blurring function achieved via fusion of the main camera and the depth-of-field camera, panoramic shooting and virtual reality (VR) shooting functions achieved via fusion of the main camera and the wide-angle camera, or other fusion shooting functions. In some embodiments, the camera component 906 may also include a flashlight. The flashlight may be a single color temperature flash or a dual color temperature flash. The dual color temperature flash is a combination of a warm flash and a cool flash and can be used for light compensation at different color temperatures.

The audio circuit 907 may include a microphone and a speaker. The microphone is configured to collect sound waves of users and environments, and convert the sound waves into electrical signals which are input into the processor 901 for processing, or input into the radio frequency circuit 904 for voice communication. For stereo acquisition or noise reduction, there may be a plurality of microphones respectively disposed at different locations of the terminal 900. The microphone may also be an array microphone or an omnidirectional acquisition microphone. The speaker is configured to convert the electrical signals from the processor 901 or the radio frequency circuit 904 into the sound waves. The speaker may be a conventional film speaker or a piezoelectric ceramic speaker. When the speaker is the piezoelectric ceramic speaker, it can not only convert the electrical signal into human-audible sound waves but also convert the signal into the sound waves which are inaudible to humans for the purpose of ranging and the like. In some embodiments, the audio circuit 907 may also include a headphone jack.

The positioning component 908 is configured to locate the current geographic location of the terminal 900 to implement navigation or location-based service (LBS). The positioning component 908 may be a positioning component based on the Global Positioning System (GPS) of the United States, the Beidou system of China, the Grenas system of Russia, or the Galileo system of the European Union.

The power source 909 is configured to power the various components in the terminal 900. The power source 909 may be alternating current, direct current, a disposable battery, or a rechargeable battery. When the power source 909 includes the rechargeable battery, the rechargeable battery may support wired charging or wireless charging. The rechargeable battery may also support the fast charging technology.

In some embodiments, the terminal 900 also includes one or more sensors 910. The one or more sensors 910 include, but are not limited to, an acceleration sensor 911, a gyro sensor 912, a pressure sensor 913, a fingerprint sensor 914, an optical sensor 915, and a proximity sensor 916.

The acceleration sensor 911 may detect magnitudes of accelerations on three coordinate axes of a coordinate system established by the terminal 900. For example, the acceleration sensor 911 may be configured to detect components of gravitational acceleration on the three coordinate axes. The processor 901 may control the display screen 905 to display a user interface in a landscape view or a portrait view according to a gravity acceleration signal collected by the acceleration sensor 911. The acceleration sensor 911 may also be configured to collect motion data of a game or a user.

The gyro sensor 912 can detect an orientation and a rotation angle of the terminal 900, and may cooperate with the acceleration sensor 911 to collect a 3D motion of the user on the terminal 900. Based on the data collected by the gyro sensor 912, the processor 901 can serve the following functions: motion sensing (such as changing the UI according to a user's tilt operation), image stabilization during shooting, game control and inertial navigation.

The pressure sensor 913 may be disposed on a side frame of the terminal 900 and/or a lower layer of the display screen 905. When the pressure sensor 913 is disposed on the side frame of the terminal 900, a gripping signal caused by a user's holding the terminal 900 can be detected. The processor 901 can perform left-right hand recognition or shortcut operation according to the gripping signal collected by the pressure sensor 913. When the pressure sensor 913 is disposed on the lower layer of the display screen 905, the processor 901 controls an operable control on the UI according to a user's pressure operation on the display screen 905. The operable control includes at least one of a button control, a scroll bar control, an icon control, and a menu control.

The fingerprint sensor 914 is configured to collect a user's fingerprint. The processor 901 identifies the user's identity based on the fingerprint collected by the fingerprint sensor 914, or the fingerprint sensor 914 identifies the user's identity based on the collected fingerprint. When the user's identity is authenticated, the processor 901 authorizes the user to perform related sensitive operations, such as unlocking the screen, viewing encrypted information, downloading software, paying, and changing settings. The fingerprint sensor 914 may be provided at the front, back, or side face of the terminal 900. When the terminal 900 is provided with a physical button or a manufacturer's Logo, the fingerprint sensor 914 may be integrated with the physical button or the manufacturer's Logo.

The optical sensor 915 is configured to collect ambient light intensity. In one embodiment, the processor 901 may control the display brightness of the display screen 905 according to the ambient light intensity collected by the optical sensor 915. Specifically, when the ambient light intensity is relatively high, the display brightness of the display screen 905 is increased; and when the ambient light intensity is relatively low, the display brightness of the display screen 905 is decreased. In another embodiment, the processor 901 may also dynamically adjust shooting parameters of the camera component 906 according to the ambient light intensity collected by the optical sensor 915.

The proximity sensor 916, also referred to as a distance sensor, is usually disposed on the front panel of the terminal 900. The proximity sensor 916 is configured to capture a distance between the user and a front surface of the terminal 900. In one embodiment, when the proximity sensor 916 detects that the distance between the user and the front surface of the terminal 900 gradually decreases, the processor 901 controls the display screen 905 to switch from a screen-on state to a screen-off state. When it is detected that the distance between the user and the front surface of the terminal 900 gradually increases, the processor 901 controls the display screen 905 to switch from the screen-off state to the screen-on state.

It can be understood by those skilled in the art that the structure shown in FIG. 9 does not constitute a limitation on the terminal 900, and may include more or fewer components than the structure as illustrated, or some components may be combined or different components arrangements may be adopted.

The embodiments of the present disclosure also provide a non-transitory computer-readable storage medium. The instructions in the storage medium, when executed by a processor of a terminal, cause the terminal to be capable of performing the decoding methods and encoding methods based on an adaptive intra refresh mechanism provided in the above embodiments.

The embodiments of the present disclosure also provide a computer program product containing instructions. The computer program product, when running on a terminal, causes the terminal to perform the decoding methods and encoding methods based on an adaptive intra refresh mechanism provided in the above embodiments.

Persons of ordinary skill in the art can understand that all or parts of the steps described in the above embodiments can be completed by hardware, or by relevant hardware instructed by applications stored in a computer-readable storage medium, such as a read-only memory, a disk, a CD, or the like.

The foregoing descriptions are merely exemplary embodiments of the present disclosure, and are not intended to limit the present disclosure. Within the spirit and principles of the disclosure, any modifications, equivalent substitutions, improvements, and the like, are within the protection scope of the present disclosure.

The invention claimed is:

1. A decoding method based on an adaptive intra refresh mechanism, the decoding method comprising:
    receiving a bit stream of a current frame;
    if there is extension data in the bit stream of the current frame and the extension data carries an adaptive intra refresh video extension identifier, ID, obtaining virtual boundary position information carried in the extension data, wherein the virtual boundary position information is for indicating a position of a virtual boundary, and the virtual boundary is at least for distinguishing a refreshed area from an unrefreshed area in the current frame; and determining whether the current frame supports an adaptive intra refresh technology based on the virtual boundary position information;
    if the current frame supports the adaptive intra refresh technology, and a previous frame of the current frame in a decoding order does not support the adaptive intra refresh technology, determining that the current frame is a random access point; and
    if there is no adaptive intra refresh video extension ID in the extension data in the bit stream of the current frame, determining that the current frame does not support the adaptive intra refresh technology,
    wherein the virtual boundary position information comprises first virtual boundary position information and second virtual boundary position information, and
    wherein the first virtual boundary position information is for indicating a pixel position of the virtual boundary in a horizontal direction of the current frame, and the second virtual boundary position information is for indicating a pixel position of the virtual boundary in a vertical direction of the current frame.

2. The decoding method according to claim 1, wherein
    the first virtual boundary position information comprises an x-coordinate of the virtual boundary in the horizontal direction of the current frame, and
    the second virtual boundary position information comprises a y-coordinate of the virtual boundary in the vertical direction of the current frame; and
    wherein the refreshed area refers to a rectangular area with coordinates (0, 0) of an upper left corner of a picture as an origin, a width being the x-coordinate, and a height being the y-coordinate, and
    the unrefreshed area refers to other areas in the current frame except the refreshed area.

3. The decoding method according to claim 1, wherein determining whether the current frame supports the adaptive intra refresh technology based on the virtual boundary position information comprises:
    if a value of the first virtual boundary position information and a value of the second virtual boundary position information are both greater than 0, determining that the current frame supports the adaptive intra refresh technology; and
    if at least one of the value of the first virtual boundary position information or the value of the second virtual boundary position information is equal to 0, determining that the current frame does not support the adaptive intra refresh technology.

4. The decoding method according to claim 1, wherein the previous frame does not support the adaptive intra refresh technology, comprises:
    there is no adaptive intra refresh video extension ID in extension data of the previous frame; or
    there is the adaptive intra refresh video extension ID in the extension data of the previous frame, and at least one of a value of first virtual boundary position information of the previous frame or a value of second virtual boundary position information of the previous frame is equal to 0.

5. The decoding method according to claim 1, further comprising:
    if it is determined that the current frame supports the adaptive intra refresh technology, and it is determined that the pixel position of the virtual boundary is equal to or exceeds a right boundary of the current frame based on the first virtual boundary position information of the current frame, and that the pixel position of the virtual boundary is equal to or exceeds a lower boundary of the current frame based on the second virtual boundary position information of the current frame, determining that the current frame is a recovery point of random access.

6. The decoding method according to claim 1, wherein an accuracy of the first virtual boundary position information is a width of a Largest Coding Unit, LCU, and an accuracy of the second virtual boundary position information is a height of the LCU.

7. A decoding device, comprising:
a processor; and
a memory configured to store instructions executable by the processor,
wherein the processor is configured to perform the steps of the decoding method according to claim 1.

8. A computer-readable storage medium storing instructions that, when executed by a processor, implement the steps of the decoding method according to claim 1.

9. An encoding method based on an adaptive intra refresh mechanism, the encoding method comprising:
determining whether a current frame supports an adaptive intra refresh technology;
if the current frame supports the adaptive intra refresh technology, carrying an adaptive intra refresh video extension identifier, ID, and virtual boundary position information of the current frame in extension data of the current frame, wherein the virtual boundary position information is for indicating a position of a virtual boundary, and the virtual boundary is at least for distinguishing a refreshed area from an unrefreshed area in the current frame;
if the current frame does not support the adaptive intra refresh technology, carrying no adaptive intra refresh video extension ID in the extension data of the current frame;
if the current frame is a random access point, determining that the current frame supports the adaptive intra refresh technology, and that a previous frame of the current frame in an encoding order does not support the adaptive intra refresh technology,
wherein the virtual boundary position information comprises first virtual boundary position information and second virtual boundary position information, and
wherein the first virtual boundary position information is for indicating a pixel position of the virtual boundary in a horizontal direction of the current frame, and the second virtual boundary position information is for indicating a pixel position of the virtual boundary in a vertical direction of the current frame.

10. The encoding method according to claim 9, wherein the first virtual boundary position information comprises an x-coordinate of the virtual boundary in the horizontal direction of the current frame, and
the second virtual boundary position information comprises a y-coordinate of the virtual boundary in the vertical direction of the current frame; and
wherein the refreshed area refers to a rectangular area with coordinates (0, 0) of an upper left corner of a picture as an origin, a width being the x-coordinate, and a height being the y-coordinate, and the unrefreshed area refers to other areas in the current frame except the refreshed area.

11. The encoding method according to claim 9, wherein if the current frame does not support the adaptive intra refresh technology, the adaptive intra refresh video extension ID is carried in the extension data of the current frame, and at least one of a value of the first virtual boundary position information carried in the extension data of the current frame or a value of the second virtual boundary position information carried in the extension data of the current frame is equal to 0.

12. The encoding method according to claim 9, further comprising:
if the current frame is a recovery point of random access, determining that the current frame supports the adaptive intra refresh technology, and that the pixel position of the virtual boundary indicated by the first virtual boundary position information is equal to or exceeds a right boundary of the current frame, and the pixel position of the virtual boundary indicated by the second virtual boundary position information is equal to or exceeds a lower boundary of the current frame.

13. The encoding method according to claim 9, wherein an accuracy of the first virtual boundary position information is a width of a Largest Coding Unit, LCU, and an accuracy of the second virtual boundary position information is a height of the LCU.

14. An encoding device, comprising:
a processor; and
a memory configured to store instructions executable by the processor,
wherein the processor is configured to perform the steps of the encoding method according to claim 9.

15. A computer-readable storage medium storing instructions that, when executed by a processor, implement the steps of the encoding method according to claim 9.

16. The encoding method according to claim 9, wherein if the current frame supports the adaptive intra refresh technology, a value of the first virtual boundary position information and a value of the second virtual boundary position information carried in the extension data of the current frame are both greater than 0.

* * * * *